(12) United States Patent  
Shaffer

(10) Patent No.: US 7,775,890 B2  
(45) Date of Patent: Aug. 17, 2010

(54) FLEXIBLE DRIVETRAIN HAVING AXIAL AND RADIAL MOTION LIMITER

(75) Inventor: Bradley J. Shaffer, Romney, IN (US)

(73) Assignee: Caterpillar Inc, Peoria, IL (US)

( * ) Notice: Subject to any disclaimer, the term of this patent is extended or adjusted under 35 U.S.C. 154(b) by 316 days.

(21) Appl. No.: 11/790,065

(22) Filed: Apr. 23, 2007

(65) Prior Publication Data  
US 2008/0257676 A1    Oct. 23, 2008

(51) Int. Cl.  
F16D 3/77    (2006.01)

(52) U.S. Cl. ........................................................ 464/98

(58) Field of Classification Search .................. 464/51, 464/98, 99; 74/572.2, 574.3, 595, 604  
See application file for complete search history.

(56) References Cited

U.S. PATENT DOCUMENTS

| 1,490,967 | A | * | 4/1924  | Denneen et al. |       |
|-----------|---|---|---------|----------------|-------|
| 5,234,278 | A |   | 8/1993  | Hall, III et al. |     |
| 5,401,213 | A | * | 3/1995  | Muchmore et al. |     |
| 6,039,651 | A | * | 3/2000  | Fukushima et al. | 464/98 |
| 6,112,869 | A |   | 9/2000  | Krause et al.  |       |
| 6,142,278 | A | * | 11/2000 | Teramae et al. |       |
| 6,264,564 | B1|   | 7/2001  | Fukushima et al. |    |
| 6,280,334 | B1| * | 8/2001  | Tsuchiya et al. | 464/98 |
| 6,283,262 | B1|   | 9/2001  | Yamamoto       |       |
| 6,301,995 | B1|   | 10/2001 | Yamamoto       |       |
| RE38,691  | E |   | 2/2005  | Tsuruta et al. |       |

FOREIGN PATENT DOCUMENTS

| DE | 750512   | * | 1/1945 | ................ 464/99 |
| EP | 0 903 511|   | 7/2001 |                         |
| JP | 09144813 |   | 6/1997 |                         |
| JP | 11082634 |   | 3/1999 |                         |

* cited by examiner

Primary Examiner—Greg Binda  
(74) Attorney, Agent, or Firm—Finnegan, Henderson, Farabow, Garrett & Dunner LLP

(57) ABSTRACT

A drivetrain for use with a power unit is disclosed. The drivetrain may have a crankshaft, a flywheel having spline teeth, and a flexible plate connecting the crankshaft to the flywheel. The drivetrain may also have a driven member having spline teeth configured to mate with the spline teeth of the flywheel, and a limiter associated with at least one of the flywheel and the driven member. The limiter may be configured to limit a maximum axial movement and a maximum radial movement between the flywheel and the driven member.

6 Claims, 2 Drawing Sheets

FLEXIBLE DRIVETRAIN HAVING AXIAL AND RADIAL MOTION LIMITER

TECHNICAL FIELD

The present disclosure is directed to a flexible drivetrain and, more particularly, to a flexible drivetrain having an axial and radial motion limiter.

BACKGROUND

Machines, including on and off-highway haul and vocational trucks, wheel loaders, motor graders, and other types of heavy machinery generally include a multi-speed, bidirectional, mechanical transmission drivingly coupled to an engine by way of a hydraulic torque converter. The hydraulic torque converter multiplies and/or absorbs torque fluctuations transmitted from the engine to the transmission by allowing slippage between a crankshaft of the engine and an input shaft of the transmission. The hydraulic torque converter is rotationally connected to and driven by the crankshaft via a splined interface.

Although the splined connection adequately transmits rotational power from the engine to the hydraulic torque converter and vice versa, because of terrain variations over which the machines travel and/or the loads to which the machines are exposed, translational shocks (i.e., sudden and/or violent axial and radial motion or force) transmitted from wheels or tools of the machine travel to the engine travel through teeth at the splined connection to the torque converter and, in reverse direction, from the torque converter's spline teeth to the engine's spline teeth. As a result, the teeth at the splined connection must be over designed for additional strength, hardened to prevent wear, massive and expensive, especially when the machine is exposed to very rough terrain.

One way to minimize tooth wear at the splined connection between an engine and a torque converter may be to isolate translational movements of the engine from the torque converter, which is described in U.S. Pat. No. 5,234,278 (the '278 patent) issued to Hall, III et al. on Aug. 10, 1993. Specifically, the '278 patent discloses a drive connection having a crankshaft to which is secured a conventional flex plate and a flywheel. The flywheel includes inner spline surfaces, an annular extension, and a plurality of tapered slots formed in the annular extension. Each slot has an opening formed in an end face of the annular extension. The drive connection also includes a torque converter input shell having a housing and a splined drive ring that cooperate to form an annular groove. The splined drive ring engages and is rotationally driven by the inner spline surfaces of the flywheel. A retainer ring is located within the annular groove formed by the housing and splined drive ring, and includes radially extending tabs that engage the slots of the flywheel through the openings in the annular extension. In this arrangement, the flex plate minimizes the transfer of axial motion and force between the engine and torque converter, while the retainer ring secures the splined members from relative axial displacement during operation of the associated engine and torque converter. By minimizing the transfer of axial motion and force, and by securing the splined members from relative axial displacement, the component life of the spline teeth may be enhanced.

Although the drive connection of the '278 patent may reduce spline tooth wear, the reduction may be minimal and expensive. Specifically, the tabs of the retaining ring only provide axial isolation for the spline teeth and, in some situations, relative radial translation between the splined teeth (i.e., separation between the teeth and re-engagement in the radial direction) can also be damaging. And, because the tabs maintain engagement with the flywheel and the torque converter housing (i.e., no gap exists therebetween such that preloading of the crankshaft is established), the amount of motion and force isolation may be minimal. In addition, the geometry of the tabs, because of the generally planar nature thereof, may only be suitable for low strength application. Further, the cost of the retaining ring, the groove formed by the housing and splined drive ring, and the open slots in the flywheel may be expensive to fabricate, difficult to assemble, and prone to improper assembly.

The drivetrain of the present disclosure solves one or more of the problems set forth above.

SUMMARY OF THE INVENTION

One aspect of the present disclosure is directed to a drivetrain. The drivetrain may include a crankshaft, a flywheel having spline teeth, and a flexible plate connecting the crankshaft to the flywheel. The drivetrain may also include a driven member having spline teeth configured to mate with the spline teeth of the flywheel, and a limiter associated with at least one of the flywheel and the driven member. The limiter may be configured to limit a maximum axial movement and a maximum radial movement between the flywheel and the driven member.

Another aspect of the present disclosure is directed to another drivetrain. The drivetrain may include a crankshaft, a flywheel, and a plate member flexibly connecting the crankshaft to the flywheel. This drivetrain may further include a structural member rigidly connected to the crankshaft and extending toward the flywheel to limit a maximum translation of the flywheel.

In another aspect, the present disclosure is directed to a method of transmitting motion. The method may include generating a rotational motion in a first member, and transmitting the rotational motion from the first member to a mass annularly disposed about the first member. The method may also include transmitting the rotational motion from the mass to a second member, and dampening axial motion between the first member and the mass. The method may further include limiting axial and radial motion between the mass and the second member.

In yet another aspect, the present disclosure is directed to another method of transmitting motion. This method may include generating a rotational motion in a first member, and transmitting the rotational motion from the first member to a mass annularly disposed about the first member. The method may also include dampening axial motion between the first member and the mass, and limiting translational motion between the first member and the mass.

DETAILED DESCRIPTION

Figure 1:
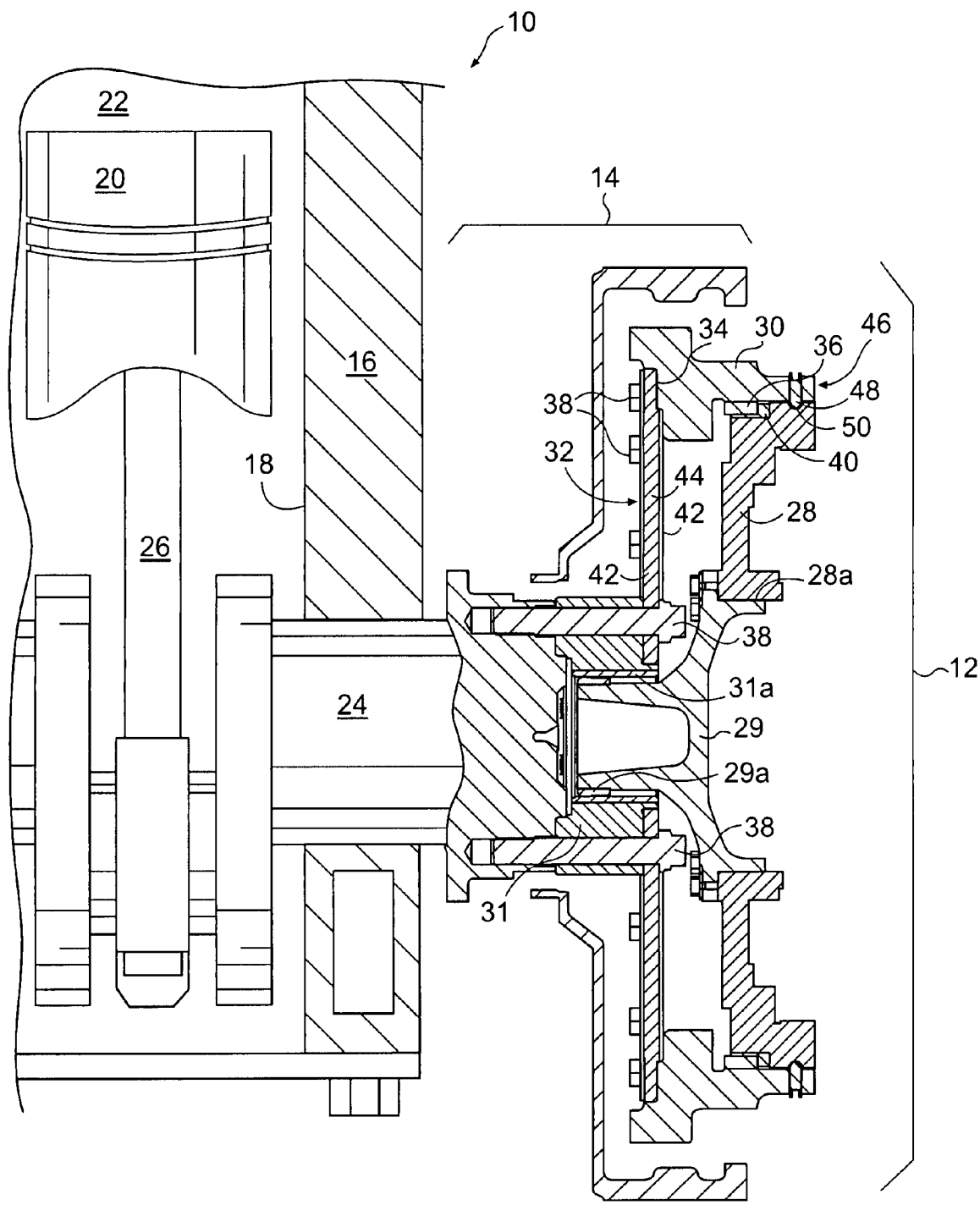
FIG. 1 is a cross-sectional illustration of an exemplary disclosed drivetrain.

FIG. 1 illustrates a power unit 10 coupled to a driven element 12 by way of a flexible drivetrain connection 14. For the purposes of this disclosure, power unit 10 is depicted and described as a four-stroke diesel engine. One skilled in the art will recognize, however, that power unit 10 may be any other type of combustion engine such as, for example, a gasoline or a gaseous fuel-powered engine; or non-combustion engine such as a fuel cell, a motor, or other power unit known in the art.

Power unit 10 may include multiple components that cooperate to combust a fuel/air mixture and produce a power output. In particular, power unit 10 may include an engine block 16 that at least partially defines one or more cylinders 18 (only one shown), a piston 20 slidably disposed within each cylinder 18, and a cylinder head (not shown) associated with each cylinder 18. In the embodiment of FIG. 1, cylinder 18, piston 20, and the cylinder head may form a combustion chamber 22. It is contemplated that power unit 10 may include any number of combustion chambers 22 and that combustion chambers 22 may be disposed in an "in-line" configuration, a "V" configuration, or any other suitable configuration.

Power unit 10 may also include a crankshaft 24 that is rotatably disposed within engine block 16. A connecting rod 26 may connect each piston 20 to crankshaft 24 so that a sliding motion of piston 20 within each respective cylinder 18 results in a rotation of crankshaft 24. Similarly, a rotation of crankshaft 24 may result in a sliding motion of piston 20.

In the disclosed embodiment, driven element 12 may include a torque converter. However, it is contemplated that driven element 12 may be another component driven by crankshaft 24 of power unit 10 such as, for example, the input shaft of a transmission unit, an electric power generator, or a pump, if desired. Driven element 12 may include an input member 28 such as the housing or shaft of the torque converter. In this embodiment, an impeller (not shown), may be connected to the housing or shaft, and driven by crankshaft 24 to generate a flow of hydraulic fluid. The flow of hydraulic fluid may then be received by another, opposing impeller (not shown) to drive an output shaft (not shown) of driven element 12. In this manner, the output shaft may be driven somewhat independently of input member 28. The amount of independent rotation between input member 28 and the output shaft of driven element 12 may be varied by modifying a pressure and/or a flow rate of the oil directed between the impellers.

Input member 28 may be at least partially supported at an internal annular surface 28a by a support element 29, also known as a torque converter nose. In some embodiments, support element 29 may be fixedly connected to input member 28 by way of threaded fasteners, and radially supported by a crankshaft adapter 31, which may be aligned with and fixedly connected to an end of crankshaft 24. A sleeve portion 29a of support element 29 may be slidingly engaged with a bore 31a of crankshaft adapter 31, and a radial space may be maintained between support element 29 and crankshaft adapter 31. This radial space may allow for lubricating oil flow and some misalignment between crankshaft 24 and support element 29.

Crankshaft 24 may be connected to drive input member 28 by way of drivetrain connection 14. Specifically, drivetrain connection 14 may include a flywheel 30, fixedly connected to a flex plate assembly 32, which, in turn, may be fixedly connected to crankshaft 24 by way of crankshaft adapter 31. Flywheel 30 may also be connected by way of splined engagement to input member 28. In this manner, rotational power from crankshaft 24 may be transmitted to input member 28.

Flywheel 30 may be any type of device for transferring power, storing rotational energy, releasing rotational energy, and/or dampening transient loads placed on or exerted by power unit 10. For example, flywheel 30 may be a fixed inertia flywheel, a variable inertia flywheel, an electric flywheel, a torsional coupling, a viscous torsional damper, a spring damper, or any other type of flywheel known in the art. Flywheel 30 may include a generally ring-like structure having a mounting surface 34, and a plurality of spline teeth 36 oriented generally orthogonal to mounting surface 34. Mounting surface 34 may be connected to flex plate assembly 32 by way of, for example, a plurality of annularly disposed threaded fasteners 38. Spline teeth 36 may be disposed around an inner annular surface of flywheel 30 to engage external spline teeth 40 of input member 28.

Flex plate assembly 32 may include components that connect flywheel 30 to crankshaft 24 for the transmission of rotational power therebetween, while allowing some relative angular and/or translational movements. Specifically, flex plate assembly 32 may include one or more retaining plates 42, and a plurality of flexible plates 44. Flexible plates 44 may be disposed between and compressed by retaining plates 42 by way of loading on threaded fasteners 38 (i.e., both those fasteners 38 attaching flex plate assembly 32 to flywheel 30, as well as additional fasteners 38 attaching flex plate assembly to crankshaft 24).

Figure 2:
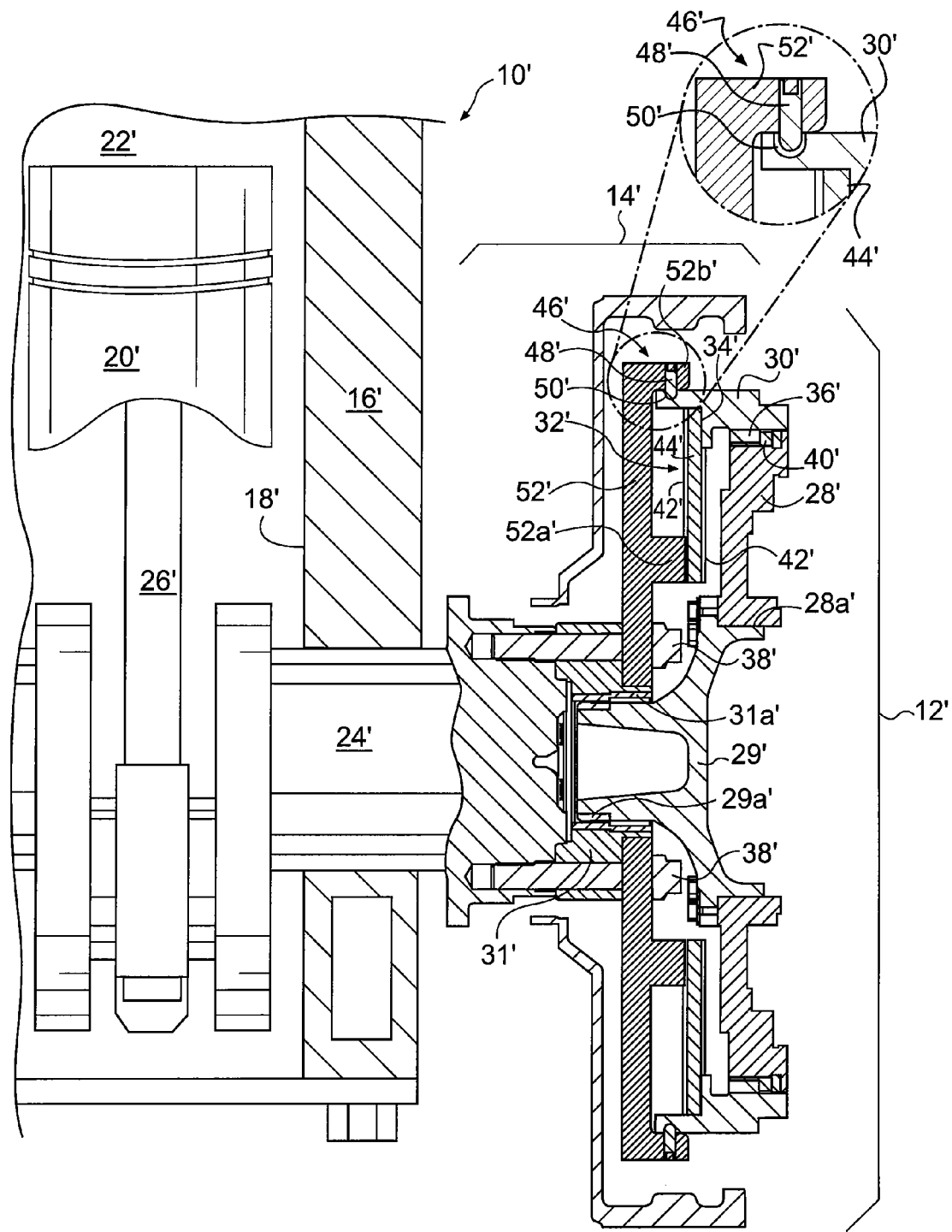
FIG. 2 is a cross-sectional illustration of another exemplary disclosed drivetrain.

In one embodiment, flexible plates 44 may include thin, circular, flexible sheets of metal such as spring steel having a moderate carbon content with high fatigue properties. In this embodiment, each sheet may have a thickness of about 0.8 mm, with a total assembly thickness (i.e., a thickness of all flexible plates 44 together, as shown in FIGS. 1 and 2) being about 11 mm. That is, there may be as many as 11 metal sheets contained within flex plate assembly 32. Because each sheet 44 is so thin, each sheet may be bendable in an axial direction, yet stiff in a rotational direction. Thus, when exposed to an axial load at the center of flex plate assembly 32, the sheets of metal may bend toward an outer periphery thereof, thereby allowing some angular and axial movement between the center and the outer periphery. In other words, crankshaft 24 may become somewhat misaligned with and/or move axially relative to flywheel 30 by bending of flex plate assembly 32, without significant axial or radial force being transmitted between the two. Yet, because of the rotational stiffness of the sheets of metal, most of the rotational power transmitted by crankshaft 24 to flex plate assembly 32 may be further transmitted to flywheel 30, and vice versa. It is contemplated that flex plates 44 may alternatively be replaced with another metal or a non-metal elastomer or plastic, if desired.

Although mounting flywheel 30 in a flexible manner to crankshaft 24 may advantageously minimize the amount of axial and radial force and motion transmitted therebetween, flex plate assembly 32, if unchecked, could facilitate excessive movements of flywheel 30 and/or vibrations of high magnitude during travel over uneven terrain that minimizes spline tooth life (i.e., the life of spline teeth 36 and 40). In order to maximize spline tooth life, a motion limiter 46 may be employed that limits a maximum relative motion between spline teeth 36 of flywheel 30 and spline teeth 40 of input member 28.

In one embodiment, motion limiter 46 may include a pin member 48 rigidly connected to one of flywheel 30 and input member 28, and loosely engaged with the other of flywheel 30 and input member 28 after assembly. Specifically, pin member 48 may be a generally cylindrical element threadingly engaged with one of flywheel 30 and input member 28 (i.e. pin member 48 may be an adjustment screw), while the other of flywheel 30 and input member 28 may include an annular blind groove 50 or oversized halo or bore that loosely receives pin member 48. Groove 50 may either be a continuous groove that multiple or all pin members 48 engage, or, alternatively, multiple grooves (i.e., one groove 50 per pin member 48). It is contemplated that pin member 48 may or may not be spring biased into groove 50 (i.e., pin member 48 may embody a spring actuated button or other type of flexible, rigid engagement member), if desired. A width of blind groove 50 relative to a diameter of pin member 48 may directly relate to a maximum amount of axial motion allowed between flywheel 30 and input member 28. A depth of blind groove 50 relative to a distance that pin member 48 extends into blind groove 50 may relate to a maximum amount of radial motion allowed between flywheel 30 and input member 28. And, a length of groove 50 relative to a diameter of pin member 48 may relate to a maximum amount of rotational motion allowed between flywheel 30 and input member 28. Although FIG. 1 illustrates pin member 48 being threadingly fixed to flywheel 30 and engaged with a groove of input member 28, pin member 48 could just as well be fixed to input member 28 and engaged with a groove in flywheel 30.

Any number of motion limiters 46 may be utilized to limit the relative movement between flywheel 30 and input member 28. Although only two motion limiters 46 are shown in FIG. 1, it is contemplated that three or more motion limiters 46 may be used and spaced apart from each other by substantially equal angles.

Because the motion of flywheel 30 may be locked to the motion of input member 28 by way of motion limiter 46, at least some of the shock loading (i.e., force and motion) experienced by flywheel 30 may be transmitted to input member 28. Specifically, when flywheel 30 experiences an axial, radial, or rotational shock (i.e., a sudden movement in an axial, radial or rotational direction, after pin member 48 has moved across the width, depth, or length of blind groove 50, pin member 48 may engage side walls of blind groove 50 and transmit the remaining motion of flywheel 30 to input member 28 such that the two components then move together. In this configuration, driven element 12 may absorb the shock loading. During the movement of flywheel 30, flex plates 44 may help dampen the movement and associated force thereof.

FIG. 2 illustrates an alternative embodiment of drivetrain connection 14' in which power unit 10' absorbs the shock loading associated with movements of flywheel 30', instead of driven member 12' absorbing the loading. Similar to the embodiment of FIG. 1, the embodiment of FIG. 2 includes power unit 10' having crankshaft 24' connected to flywheel 30' by way of flex plate assembly 32', with flywheel 30' being connected to input member 28' by way of spline teeth 36' and 40'. However, in contrast to the embodiment of FIG. 1, the connection between crankshaft 24' and flex plate assembly 32' of FIG. 2 may be an indirect connection. Specifically, a structural member 52' such as a ring gear carrier may be fixedly connected to crankshaft 24', with flex plate assembly 32' being connected to structural member 52'. That is, structural member 52' may include a first annular protrusion 52a', and a second annular protrusion 52b'. Flex plate assembly 32' may be connected by way of, for example, threaded fasteners (not shown) to first annular protrusion 52a' and to mounting surface 34' of flywheel 30'.

Structural member 52' may support motion limiter 46'. In particular, structural member 52' may extend radially past an outer curved surface of flywheel 30' such that second annular protrusion 52b' extends in an axial direction over an end portion of flywheel 30'. That is, second annular protrusion 52b' may be located radially outward of flywheel 30'. Structural member 52' may include a threaded bore that receives pin member 48', and flywheel 30' may include blind groove 50' to receive pin member 48'. In this configuration, flywheel 30' may move under shock loading until pin member 48' engages the walls of blind groove 50'. When pin member 48' engages the walls of pin member 48', the shock loading (i.e., movement and/or force associated with the movement) of flywheel 30' may be transmitted to structural member 52' and back into power unit 10' by way of crankshaft 24'. This configuration may help retain engine-induced shock loading with power unit 10' rather than transmitting the loading to the attached driven element 12'.

It is contemplated that pin member 48 and bore 50 may interoperate within, be surrounded by, or be otherwise pressure fed a lubricating viscous oil that cools surfaces of pin member 48 and groove 50, dampens vibrations thereof, and/or improves wear durability of the surfaces. It is also contemplated that the surfaces of pin member 48 and groove 50 might be made concave, convex, or any of many shapes and textures that promote lubrication of the surfaces and dampening of vibrations.

INDUSTRIAL APPLICABILITY

The flexible drivetrain connection of the present disclosure may be applicable to any power unit/driven element configuration where the transmission of translational shock loading between the power unit and driven unit is undesired. The disclosed flexible drivetrain connection may minimize loading and improve the component life of an associated spline interface with the use of a flexible flywheel-to-crankshaft connection. Operation of the disclosed drivetrain connection will now be explained.

As a fuel/air mixture is combusted by power unit 10, the reciprocating motion of pistons 20 may be translated to a rotation of crankshaft 24. This rotational motion may then be transmitted to flywheel 30 by way of flex plate assembly 32, and from flywheel 30 to driven element 12 by way of spline teeth 36 and 40.

During motion of power unit 10 such as during the operation of a mobile machine that utilizes power unit 10 as a prime mover, shock loading may be induced within power unit 10. If transmitted in its entirety to driven element 12, the induced shock loading may damage components of driven element 12. Flex plate assembly 32 may minimize the amount of shock loading transmitted between power unit 10 and driven element 12 by allowing some movement between flywheel 30 and crankshaft 24 and by absorbing some of the loading with the bending of flex plates 44.

In order to prevent tooth wear at the splined connection between power unit 10 and driven element 12, relative movement between spline teeth 36 and 40 must be limited. Motion limiter 46 may provide this motion limiting, without cancelling the effects of flex plate assembly 32. Specifically, because pin member 48 of motion limiter 46 may be loosely engaged with blind groove 50, some movement of pin member 48 within blind groove 50 may be allowed. However, as pin member 48 engages walls of blind groove 50, further relative motion between splined teeth 36 and 40 may be prevented.

The disclosed flexible drivetrain connection may be robust and provide a great range of motion in a simple low cost configuration. Specifically, because the disclosed motion limiter may include a pin member having a substantially cylindrical shape, the motion limiter may have increased strength over a generally planar element. In addition, because the pin member may engage a blind groove and is spaced from the groove both in width, depth, length by predetermined amounts corresponding with desired amounts of relative axial, radial, and rotational movement, the pin member may provide axial, radial, and rotational motion limiting. In addition, because motion limiting may be provided by way of substantially simple pin members and grooves, the cost of the flexible drivetrain connection may be minimal.

It will be apparent to those skilled in the art that various modifications and variations can be made to the drivetrain of the present disclosure without departing from the scope of the disclosure. Other embodiments will be apparent to those skilled in the art from consideration of the specification and practice of the drivetrain disclosed herein. It is intended that the specification and examples be considered as exemplary only, with a true scope of the disclosure being indicated by the following claims and their equivalents.

What is claimed is:

1. A drivetrain, comprising:
a crankshaft;
a flywheel;
a plate member flexibly connecting the crankshaft to the flywheel;
a structural member rigidly connected to the crankshaft and extending toward the flywheel;
a limiter associated with at least one of the flywheel and the structural member, wherein the limiter is configured to allow relative movement between the flywheel and the structural member and further configured to prevent relative movement between the flywheel and the structure member beyond a predetermined amount; and
a torque converter connected to the flywheel by way of a splined interface.

2. The drivetrain of claim 1, wherein the crankshaft absorbs shock loading of the flywheel.

3. A power unit, comprising:
an engine having a crankshaft, a flywheel, and a flexible plate connecting the crankshaft to the flywheel;
a torque converter having a housing connected to the flywheel by way of a splined connection; and
a limiter associated with at least one of the flywheel and the housing, wherein the limiter is configured to allow relative movement between the flywheel and the crankshaft and further configured to prevent relative movement between the flywheel and the crankshaft beyond a predetermined amount.

4. The power unit of claim 3, wherein the limiter prevents relative axial movement and relative radial movement between the flywheel and the crankshaft beyond a predetermined amount.

5. The power unit of claim 3, wherein the predetermined amount is less than the relative amount of movement between the flywheel and the crankshaft allowed by bending of the flexile plate.

6. A power unit, comprising:
an engine having a crankshaft, a flywheel, and a flexible plate connecting the crankshaft to the flywheel;
a torque converter having a housing connected to the flywheel by way of the spline connection; and
a limiter associated with at least one of the flywheel and the housing to limit an axial translation and a radial translation during motion of the power unit, wherein the limiter includes:
a structural member rigidly connected to the crankshaft and extending toward the flywheel; and
a pin member extending from the structural member to a groove in the flywheel.

* * * * *